United States Patent [19]
Yoo et al.

[11] Patent Number: 5,986,993
[45] Date of Patent: Nov. 16, 1999

[54] OPTICAL PICKUP DEVICE HAVING A DIAPHRAM WITH A PREDETERMINED APERTURE

[75] Inventors: Jang-hoon Yoo; Chul-woo Lee, both of Seoul; Kyung-hwa Rim, Suwon, all of Rep. of Korea

[73] Assignee: Samsung Electronics Co., Ltd., Seoul, Rep. of Korea

[21] Appl. No.: 08/779,520

[22] Filed: Jan. 7, 1997

[30] Foreign Application Priority Data

Jan. 11, 1996 [KR] Rep. of Korea .......................... 96-423

[51] Int. Cl.⁶ ........................................................ G11B 7/00
[52] U.S. Cl. ............................................. 369/112; 369/118
[58] Field of Search .................................... 369/118, 117, 369/112, 103, 109

[56] References Cited

U.S. PATENT DOCUMENTS

| | | | |
|---|---|---|---|
| 4,375,096 | 2/1983 | Gorog et al. | 369/118 |
| 4,411,500 | 10/1983 | Yonezawa et al. | 369/118 |
| 4,460,990 | 7/1984 | Opheij | 369/118 |
| 4,477,891 | 10/1984 | Gorog | 369/109 |
| 5,235,581 | 8/1993 | Miyagawa et al. | 369/44.12 |
| 5,281,797 | 1/1994 | Tatsuno et al. | 369/118 |
| 5,446,565 | 8/1995 | Komma et al. | 369/112 |
| 5,587,981 | 12/1996 | Kamatani | 369/58 |
| 5,665,957 | 9/1997 | Lee et al. | 369/118 |

FOREIGN PATENT DOCUMENTS 0 078 580  5/1983  European Pat. Off. .
2052132A   1/1984  United Kingdom .

OTHER PUBLICATIONS

Patent Abstracts of Japan, vol. 010, No. 330(P–514), Nov. 11, 1986, & JP 61 134942 A (NEC Corp), Jun. 23, 1986, *summary*.
Patent Abstracts of Japan, vol. 005, No. 185 (P–091), Nov. 25, 1981, & JP 65 114136 A (Matsushita Elect. Ind. Co. Ltd.), Sep. 8, 1981, *summary*.
Patent Abstracts of Japan, vol. 004, No. 142 (P–030), Oct. 7, 1980 & JP 55 089924 A (Toshiba Corp), Jul. 8, 1980, *summary*.
Patent Abstracts of Japan, vol. 017, No. 491 (P–1607), & JP 05 120720 A (Toshiba Corp), May 18, 1993, *summary*.
Patent Abstracts of Japan, vol. 096, No. 006, Jun. 28, 1996 & JP 08 045105 A (Matsushita Elect. Ind. Co. Ltd.), Feb. 16, 1996, *summary*.
Patent Abstracts of Japan—Publication Number 61134942.
Patent Abstracts of Japan—Publication Number 56114136.
Patent Abstracts of Japan—Publication Number 55089924.
Patent Abstracts of Japan—Publication Number 05120720.
Patent Abstracts of Japan—Publication Number 08045105.

*Primary Examiner*—Tan Dinh
*Attorney, Agent, or Firm*—Staas & Halsey

[57] ABSTRACT

An optical pickup device which can obtain a stable reproduction signal by increasing the numerical aperture of an objective lens includes an objective lens facing a disc, a light source for radiating light to the disc via the objective lens, a beam splitter provided between the light source and objective lens for directing the light reflected from the disc in a path different from that of the light travelled from the light source, a photodetector for detecting the light reflected from the disc and travelled via the beam splitter, and a diaphragm provided between the beam splitter and light source and having a predetermined numerical aperture.

37 Claims, 6 Drawing Sheets

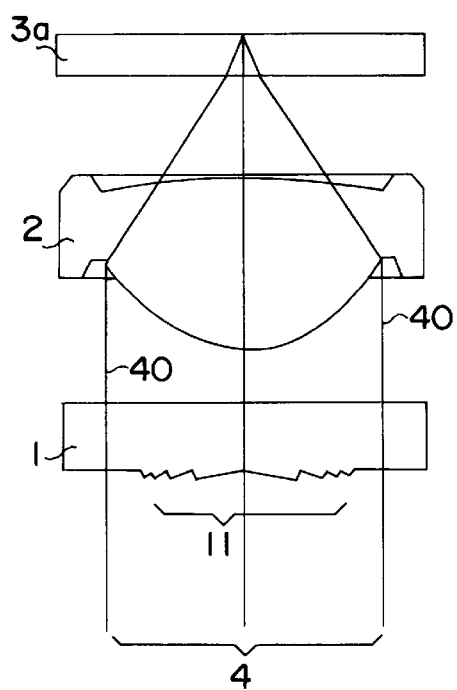 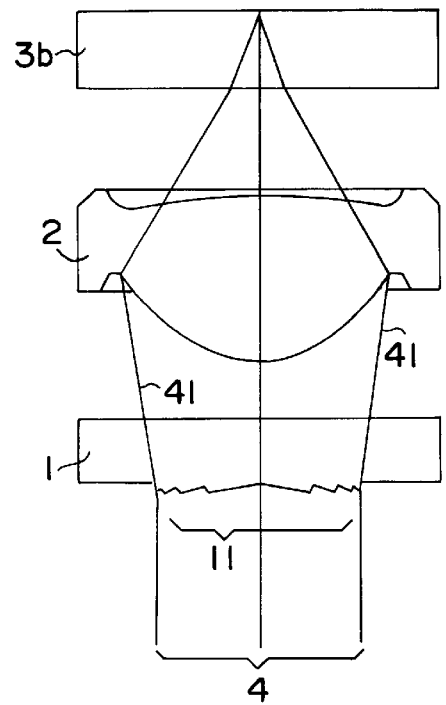
FIG. 1
PRIOR ART
FIG. 2
PRIOR ART

OPTICAL PICKUP DEVICE HAVING A DIAPHRAM WITH A PREDETERMINED APERTURE

BACKGROUND OF THE INVENTION

1. Field of the Invention

The present invention relates to an optical pickup device, and more particularly, to an optical pickup device which can obtain a stable reproduction signal by increasing the numerical aperture of an objective lens.

An optical pickup records and reproduces information such as video or audio data onto/from optical recording media, e.g., discs. The structure of a disc is such that a recorded surface is formed on a substrate made of plastic or glass. In order to read or write information from a high-density disc, the diameter of the optical spot must be very small. To this end, the numerical aperture (NA) of an objective lens is generally made large and a light source having a shorter wavelength is used. Using the shorter wavelength light source and large numerical aperture, however, reduces a tilt allowance of the disc with respect to the optical axis. The thus-reduced disc tilt allowance can be increased by reducing the thickness of the disc.

Assuming that the tilt angle of the disc is θ, the magnitude of a coma aberration coefficient $W_{31}$ can be obtained from:

$$W_{31} = -\frac{d}{2}\left(\frac{n^2(n^2-1)\sin\theta\cos\theta}{(n^2-\sin^2\theta)^{\frac{5}{2}}}\right)NA^3$$

where d and n represent the thickness and refractive index of the disc, respectively. As understood from the above relationship, the coma aberration coefficient is proportional to the cube of the numerical aperture. Therefore, considering that the numerical aperture of the objective lens required for a conventional compact disc is 0.45 and that for a digital video disc is 0.6, a digital video disc has a coma aberration coefficient of about 2.34 times that of a compact disc having the same thickness. The maximum tilt allowance of the digital video disc is therefore controlled to be reduced to about half that of the conventional compact disc. Accordingly, in order to assimilate the maximum tilt allowance of the digital video disc to that of the compact disc, the thickness of the digital video disc should be reduced.

However, such a thickness-reduced disc adopting a shorter wavelength (high density) light source, e.g., a digital video disc, cannot be used in a conventional recording/reproducing apparatus, e.g., a disc drive for the compact disc adopting a longer wavelength light source, because a disc having a non-standard thickness (digital video disc) results in a spherical aberration corresponding to the difference in disc thickness from that of a normal disc (compact disc). If the spherical aberration is greatly increased, the spot formed on the disc cannot have the light intensity necessary for recording, which prevents accurate recording of the information. Also, during reproduction, the signal-to-noise ratio is too low to reproduce the information accurately.

Therefore, an optical pickup adopting a light source having a short wavelength, e.g., 650 nm, which is compatible for discs having different thicknesses, such as a compact disc or digital video disc, is necessary.

2. Description of the Related Art

For the above purpose, research into apparatuses which can reproduce and record information from/onto two kinds of discs having different thicknesses with a single optical pickup device adopting a shorter wavelength light source is underway. Lens devices respectively adopting a hologram lens and a refractive lens have been proposed (Japanese Patent Laid-open Publication No. hei 7-98431).

FIGS. 1 and 2 show the focusing of zero-order and first-order-diffracted light onto discs 3a and 3b having different thicknesses, respectively. A hologram lens 1, provided with a lattice pattern 11, and a refractive objective lens 2 are provided along the light path in front of discs 3a and 3b. The lattice pattern 11 diffracts light beams 4 from a light source (not shown) passing through the hologram lens 1, to thereby separate the passing light into first-order-diffracted light 41 and zero-order light 40 each of which is focused with a different intensity by objective lens 2 for the appropriate focus point on the thicker disc 3b or the thinner disc 3a, and thus enable data read/write operations with respect to discs having different thicknesses.

However, in using such a lens device, the separation of the light into two beams (i.e., the zero-order and first-order light) by hologram lens 1 lowers the utilizing efficiency of the actually regenerated light to about 15%. Also, during a read operation, the information is included in only one of the two beams, and the beam carrying no information is likely to be detected as noise. Moreover, the fabrication of such a hologram lens requires a high-precision process for etching a fine hologram pattern, which increases manufacturing costs.

FIG. 3 is a schematic diagram of a conventional optical pickup device (U.S. Pat. No. 5,281,797) which, in lieu of using a hologram lens as above, includes an aperture diaphragm 1a for changing the aperture diameter, so that data can be recorded onto a longer wavelength disc as well as a shorter wavelength disc and so that information can be reproduced therefrom. An aperture diaphragm 1a is installed between an objective lens 2 facing a disc 3 and a collimating lens 5 and controls a light beam 4 emitted from a light source 9 and transmitted through a beam splitter 6, by appropriately adjusting the area of the light beam passing region, i.e., the numerical aperture. The diametrical aperture of the aperture diaphragm 1a is adjusted in accordance with the focused spot size on the disc being employed and always passes the light beam 4a of the central region but passes or blocks the light beam 4b of the peripheral region in accordance with the adjusted state thereof. In FIG. 3, a reference numeral 7 denotes a focusing lens and reference numeral 8 denotes a photodetector.

In the optical device having the above configuration, if the variable diaphragm is formed by a mechanical diaphragm, its structural resonance characteristics change depending on the diaphragm's effective aperture, and thus installation onto an actuator for driving the objective lens becomes difficult in practice. To solve this problem, liquid crystal may be used for forming the diaphragm. This, however, greatly impedes the miniaturization of the system, deteriorates heat-resistance and endurance, and increases manufacturing costs.

Alternatively, a separate objective lens for each disc may be provided so that a specific objective lens is used for a specific disc. In this case, however, since a driving apparatus is needed for replacing lenses, the configuration becomes complex and manufacturing costs increase accordingly.

SUMMARY OF THE INVENTION

It is an object of the present invention to provide an improved objective lens device which can obtain stable reproduction and servo signals by increasing the numerical aperture of the objective lens.

To accomplish the above and other objects, there is provided an optical pickup device according to the present invention comprising an objective lens facing a disc; a light source for radiating light to the disc via the objective lens; a beam splitter provided between the light source and objective lens for directing the light reflected from the disc in a path different from that of the light travelled from the light source; a photodetector for detecting the light reflected from the disc and travelled via the beam splitter; and a diaphragm provided between the beam splitter and light source and having a predetermined numerical aperture.

Also, according to another aspect of the present invention, there is provided an optical pickup device comprising an objective lens unit having an objective lens facing a disc and a light controller for controlling the light of the intermediate region between a near axis region and a far axis region of the light incident onto the disc; a light source for radiating light to the disc via the objective lens; a beam splitter provided between the light source and objective lens for directing the light reflected from the disc in a path different from that of the light travelled from the light source; a photodetector for detecting the light reflected from the disc and travelled via the beam splitter; and a diaphragm provided between the beam splitter and light source and having a predetermined numerical aperture smaller than that of the objective lens.

BRIEF DESCRIPTION OF THE DRAWINGS

The above and other objects and advantages of the present invention will become more apparent by describing in detail preferred embodiments thereof with reference to the attached drawings in which:

FIGS. 1 and 2 are schematic diagrams of a conventional optical pickup device having a hologram lens, showing the states where a light beam is focused onto a thin disc and a thick disc, respectively;

DETAILED DESCRIPTION OF THE INVENTION

Figure 3:
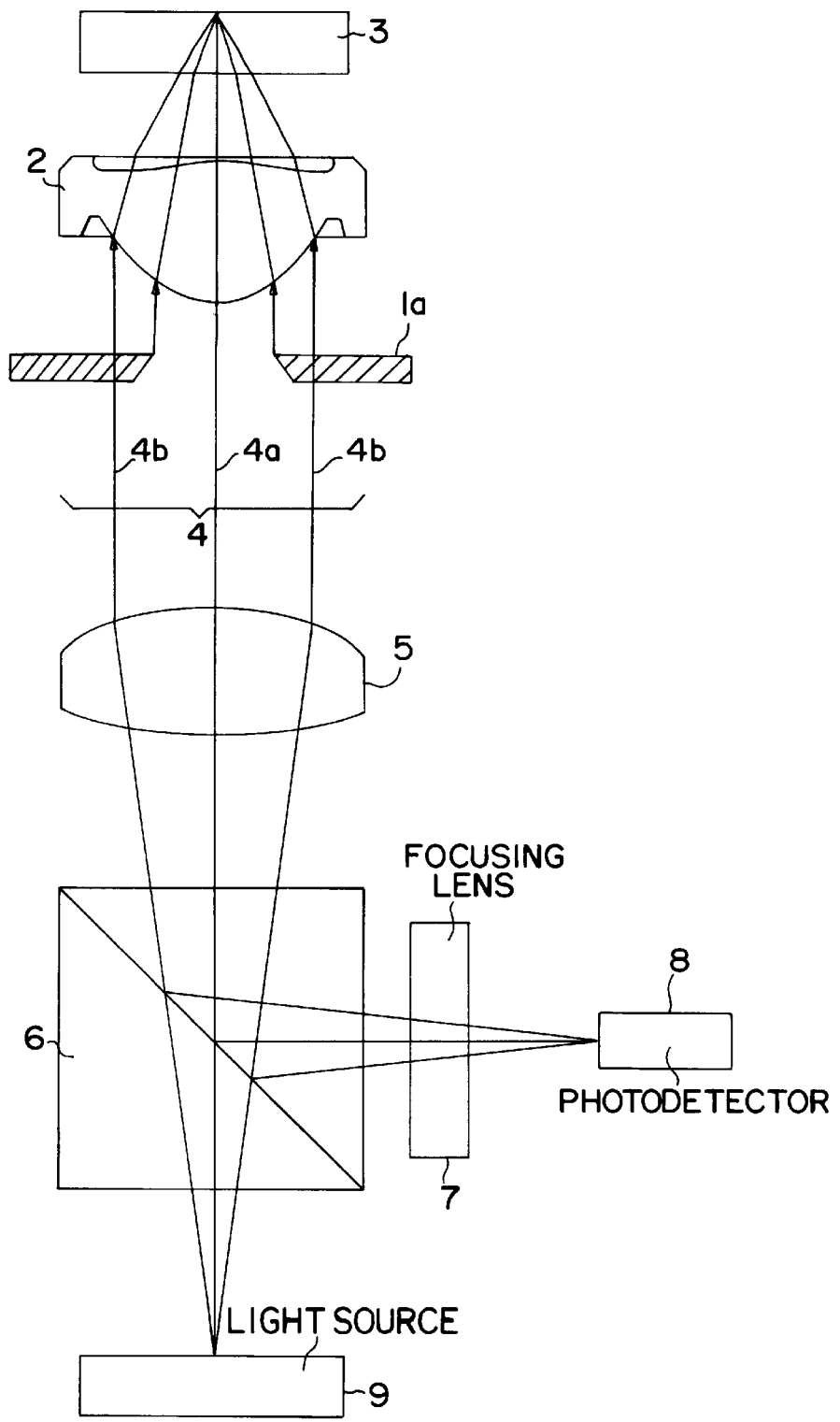
FIG. 3 is a schematic diagram of another conventional optical pickup device.
Figure 4:
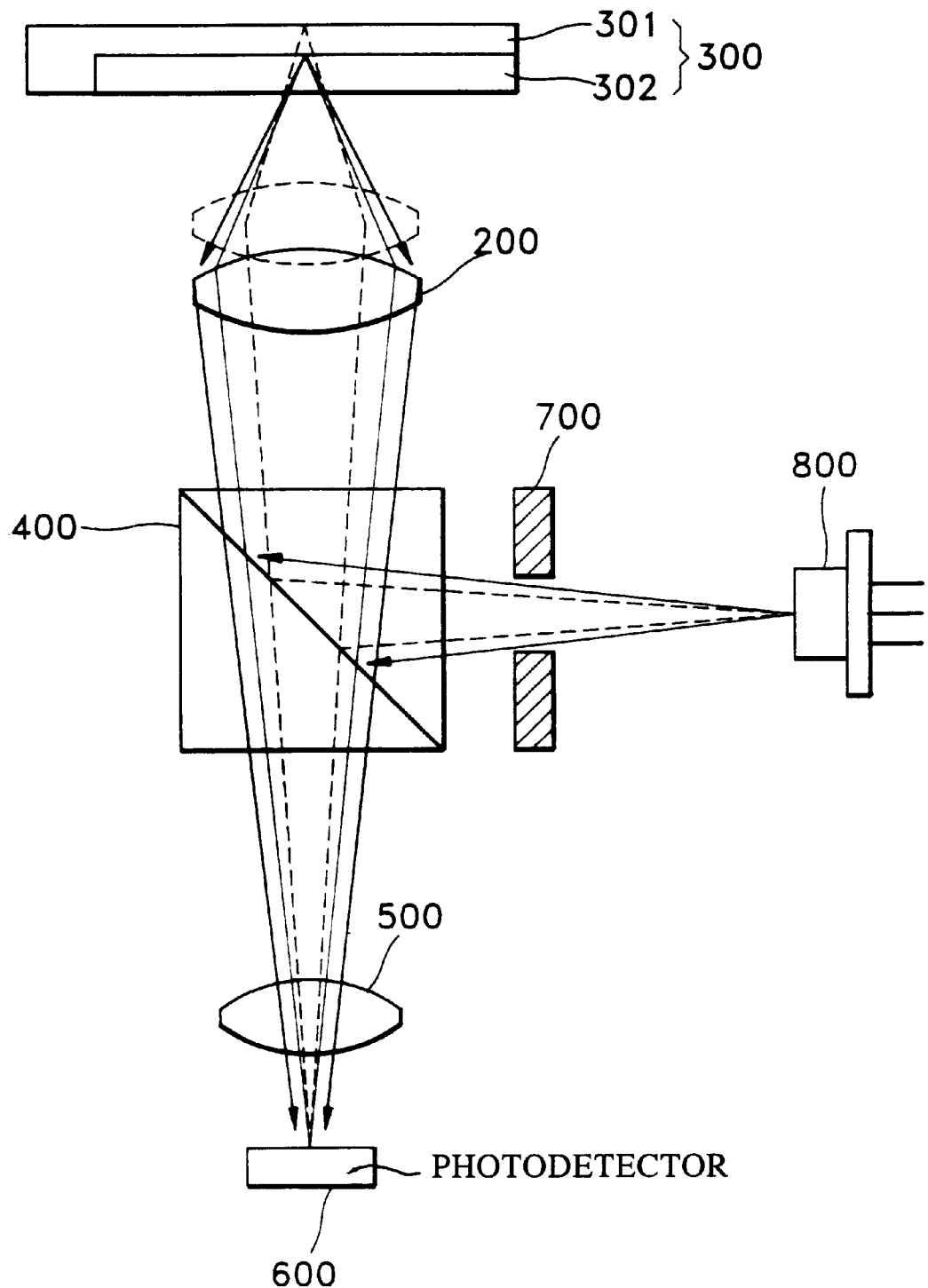
FIG. 4 is a schematic diagram of an optical pickup according to a first embodiment of the present invention.

Referring to FIG. 4, reference numerals 301 and 302 represent a thick disc and a thin disc, respectively, which are overlapped for the sake of a better understanding of the optical pickup device according to the present invention.

An objective lens unit 200 facing a disc 300 (either thick disc 301 or thin disc 302) and a photodetector 600 are positioned along a linear light path, and a beam splitter 400 and a detecting lens 500 are sequentially interposed therebetween. A light source 800 such as a laser diode is positioned at the end of another light path, i.e., one divided from the beam splitter 400. A diaphragm 700 having a predetermined aperture ratio, e.g., 0.6, is interposed between the beam splitter 400 and light source 800.

Figure 5:
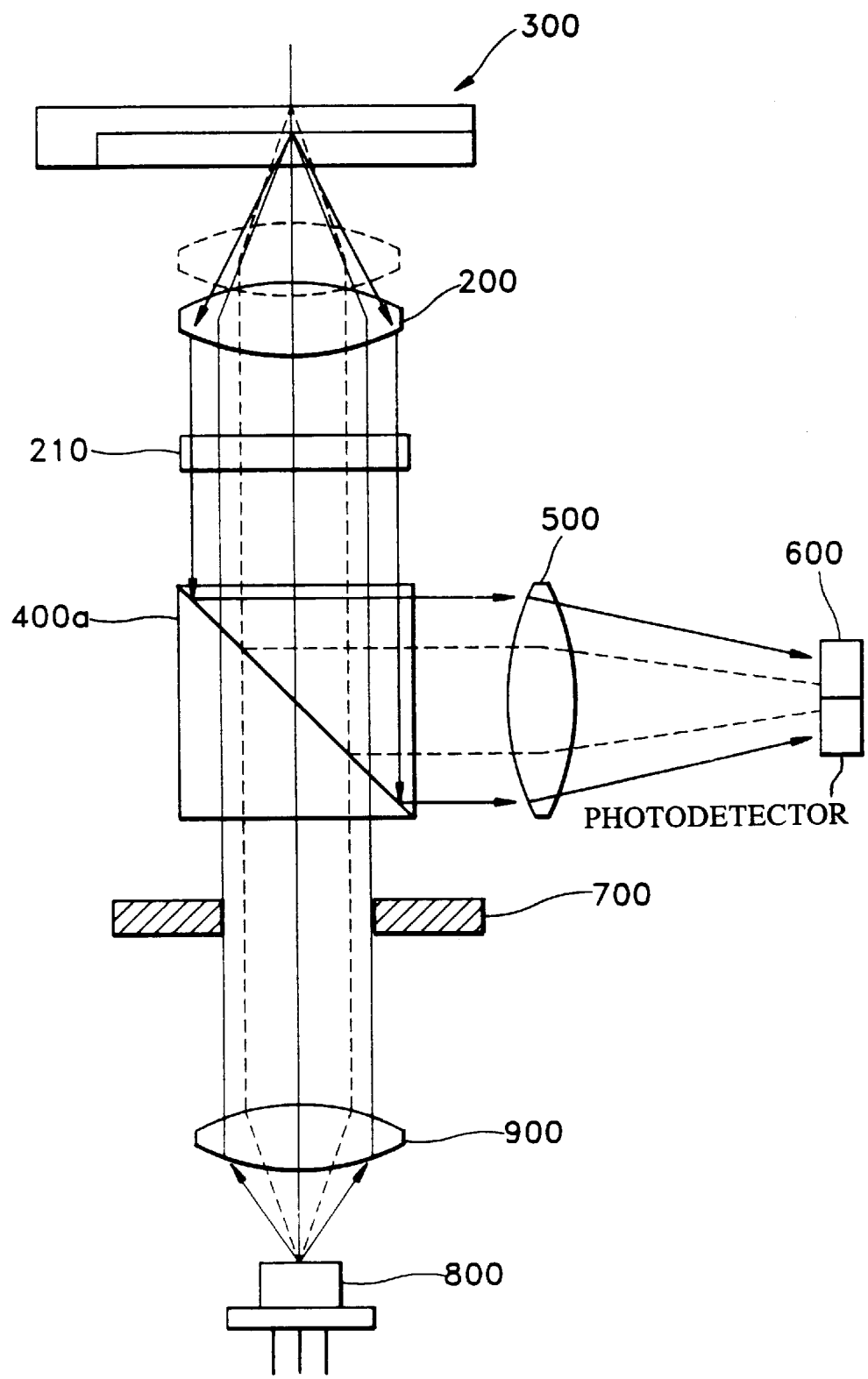
FIG. 5 is a schematic diagram of an optical pickup according to a second embodiment of the present invention.

FIG. 5 is a schematic diagram of an optical pickup according to a second embodiment of the present invention.

In this embodiment, in contrast to the first embodiment, a light source 800 and an objective lens unit 200 are positioned in a linear light path, and a wavelength plate 210 and a polarizing splitter 400a are interposed therebetween. A photodetector 600 is positioned at the end of another light path, i.e., one divided by the polarizing splitter 400a, and a detecting lens 500 is provided in front of the photodetector 600. A diaphragm 700 as a characteristic of the present invention is positioned between the polarizing splitter 400a and the light source 800, and a collimating lens 900 for focusing the light from the light source 800 is positioned between the diaphragm 700 and the light source 800.

In the optical pickup device of the present invention, the objective lens unit 200 has various structures, as follows.

Figure 6:
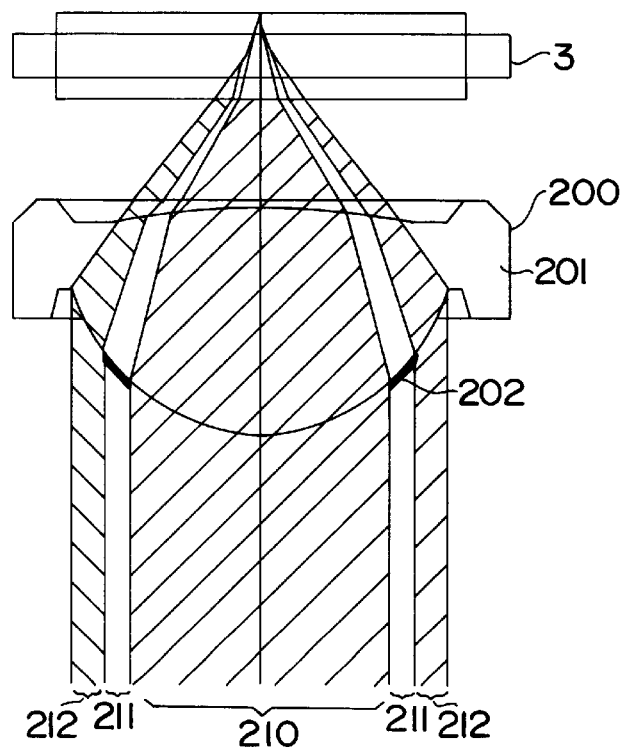
FIGS. 6 through 8 are schematic side views showing various structures of an objective lens unit adopted for the optical pickup device according to the first and second embodiments of the present invention.

As shown in FIG. 6, the objective lens unit 200 has an objective lens 201 provided with a light controlling film 202 for controlling the light of the intermediate region 211 between the far axis region 212 and near axis 210 region of the light which is radiated onto the disc 3.

In this embodiment, the light around an axis in the center of a light path, i.e., in an intermediate region 211 between near axis and far axis regions 210, 210, is blocked or shielded to form a small light spot from which interference of the light in the intermediate region is suppressed. To this end, in the intermediate region 211 between the near axis 210 and the far axis 212 along the incident light path, there is provided light controlling means of an annular or a perimetrical polygon (e.g., a square) shape for blocking or scattering light. This utilizes the fact that the light of the far axis region 212 does not affect the central light but the light of the intermediate region 211 between the near axis 210 and the far axis 212 does. Here, the near axis 210 region represents the region around the axis of the lens (defined as an optical axis in the optics) having a substantially negligible aberration, the far axis region 212 represents the region which is farther from the optical axis than the near axis region, and the intermediate region 211 is the region 210 between the near axis region and the far axis region 212.

Figure 7:
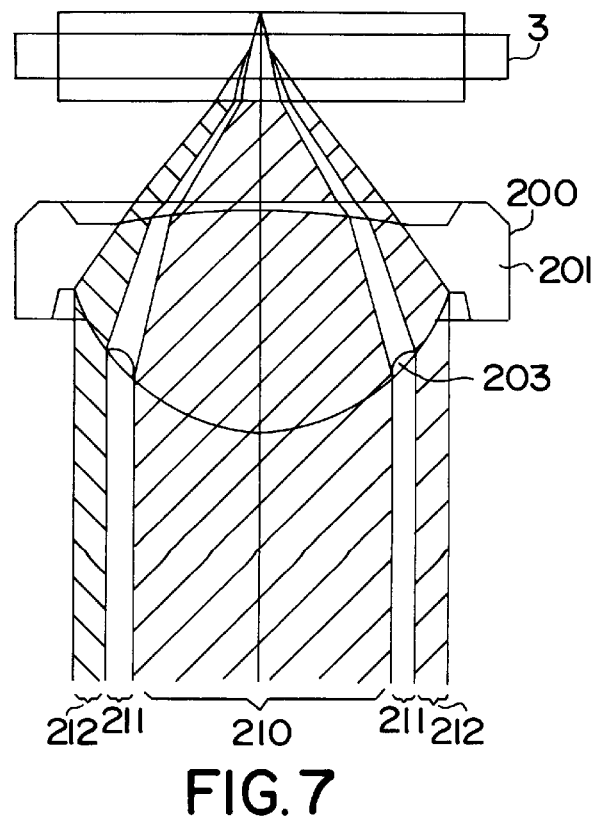

Also, as shown in FIG. 7, the objective lens unit 200 has an objective lens 201 provided with a light controlling groove 203 of a predetermined pattern as light controlling means for controlling the light of the intermediate region 211.

Figure 8:
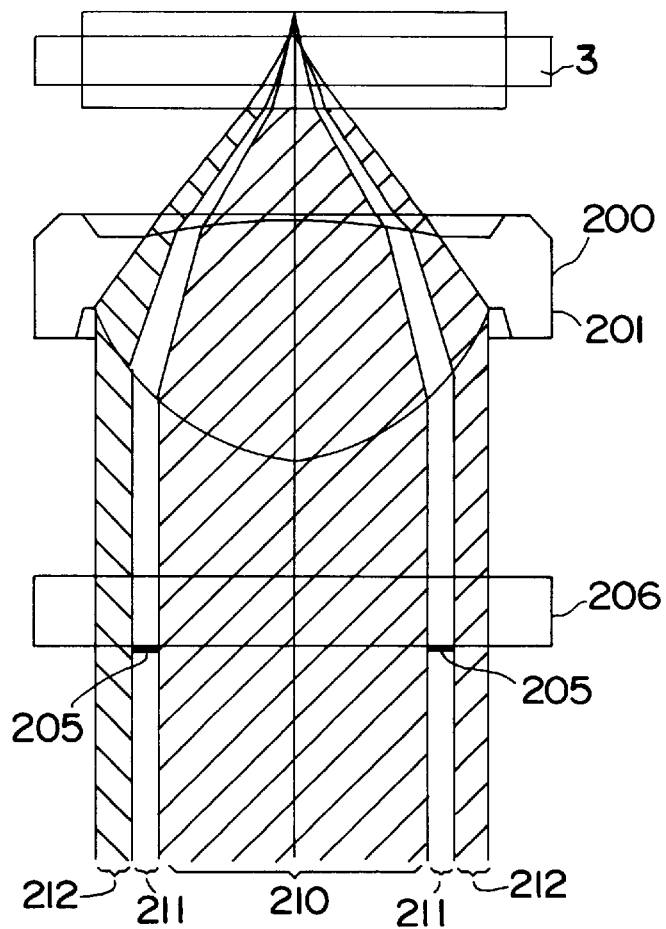

Further, as shown in FIG. 8, the objective lens unit 200 has a light controlling member 206 provided with a light controlling film 205 for controlling the light of the intermediate region 211, among the light beams travelling toward the objective lens 201.

In the objective lens unit 200 having the aforementioned structure, the light controlling film or groove for controlling the light is of an annular or a perimetrical polygon (e.g., a square) shape. However, the present invention is not limited to these shapes.

In the optical pickup device according to the embodiments of the present invention, the diaphragms should be set such that the aperture ratio for the incident light travelling toward the objective lens is 0.6. When information is reproduced from a thin disc (e.g., 0.6 mm digital video disc), the magnitude of a reproduction signal is determined by the magnitude ratio of zero-order diffracted light by disc tracks to ±first-order diffracted light. At this time, since the pit is small and the track period is short, the magnitude of the signal is smaller than that of the signal for existing compact discs. Thus, if each magnitude of reproduction and servo signals is increased, more stable reproduction can be realized.

According to experiments, in the case of reproducing a signal from a disc such as the digital video disc, the present invention can be adopted to increase the magnitude of the signal. Since the diaphragm featuring the present invention has a predetermined numerical aperture, e.g., 0.6, that of the light focused onto the disc becomes 0.6 without separately defining that of the objective lens to 0.6. Further, the numerical aperture of the light reflected from the disc and then travelling toward a photodetector will have a numerical aperture exceeding 0.6, which can increase the light amount of a light receiving unit. According to the experimental results, under the condition that the numerical aperture of the diaphragm was set to 0.6 and that of the objective lens was set to a range from 0.6 to 0.63, stable track and jitter signals were obtained.

Figure 9:
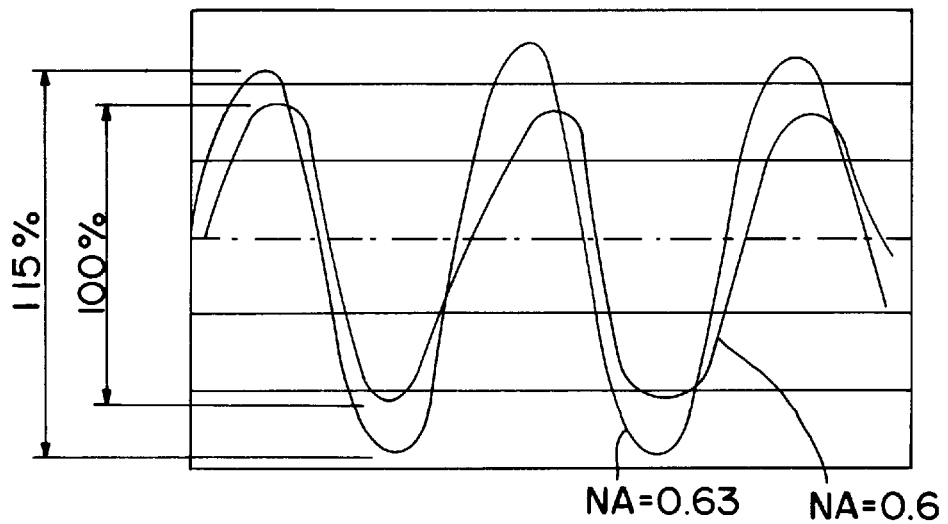
FIG. 9 is a graph showing the change of track signals depending on the change in the numerical aperture of an objective lens in the optical pickup device according to the first and second embodiments of the present invention.

FIG. 9 shows the change in track signals when the numerical aperture of the objective lens is changed. As shown in FIG. 9, when the numerical aperture of the objective lens is 0.63, the magnitude of the track signal is increased by 15%, compared with that in the case when the numerical aperture of the objective lens is 0.6.

In other words, in the optical pickup device according to the present invention, the numerical aperture of the objective lens is increased from 0.6 to 0.63 and that of the diaphragm for the light from the light source is set to 0.6, which is lower than that of the objective lens, thereby obtaining high and stable reproduction and track signals. Also, in the case of an optical pickup device adopting light blocking means having a constant area for an objective lens unit, since the light incident into a disk is restricted in the numerical aperture to 0.6, more stable reproduction and track signals are obtained while maintaining a jitter characteristic and tolerance with respect to disc tilt than those of a conventional optical pickup device. Particularly, in an optical pickup device adopting an objective lens unit provided with light blocking means, when the wavelength ($\lambda$) of the used light source is less than 1.69 times a value obtained by multiplying the numerical aperture (NA) by the disc track period (Tp) in the following relationship, the stabilizing effect can be enhanced:

$$\frac{\lambda}{NA}\left(\frac{1}{Tp}\right) \leq 1.69.$$

The following table shows the design specification of an objective lens having a numerical aperture of 0.63. Here, the material used for the objective lens is plastic or glass having a refractive index of about 1.58.

| curvature | thickness | material | | aspherical coefficient |
|---|---|---|---|---|
| 2.68757 | 2.347254 | plastic | K = | 0 |
| | | | A = | −0.156443E − 02 |
| | | (n = 1.58) | C = | −0.111654E − 03 |
| | | | B = | 0.201498E − 04 |
| | | | D = | 0.869690E − 05 |
| −11.59016 | 2.295899 | air | K = | 0 |
| | | | A = | −0.159834E − 01 |
| | | | C = | 0.376504E − 03 |
| | | | B = | −0.284166E − 02 |
| | | | D = | 0.306105E − 04 |

In the optical pickup device satisfying the condition of the above relationship, when a thick disc having an optimized objective lens is to be compatibly used with a thin disc, light blocking means is provided in an objective lens unit and a diaphragm is provided along a light path from a light source, as described above.

According to the present invention, the present invention can be adopted for an optical pickup device provided with light blocking means as well as a conventional optical pickup device. Also, irrespective of the thickness of a disc, a stable reproduction signal can be obtained.

What is claimed is:

1. An optical pickup device comprising:
   an objective lens facing a disc and having a first numerical aperture;
   a light source for radiating light into the disc via said objective lens;
   a beam splitter provided between said light source and objective lens for directing the light reflected from the disc in a path different from that of the light travelled from said light source;
   a photodetector for detecting the light reflected from the disc and travelled via said beam splitter; and
   a diaphragm provided between said beam splitter and light source and having a predetermined second numerical aperture smaller than the first numerical aperture, wherein said diaphragm has an opening which completely passes the light radiated by said light source and a blocking region to completely block the light radiated by said light source.

2. An optical pickup device as claimed in claim 1, wherein said photodetector and objective lens are positioned in a first linear light path and said light source is positioned in a second linear light path distinct from said first linear light path and divided by said beam splitter.

3. An optical pickup device as claimed in claim 1, wherein said light source and objective lens are positioned in a first linear light path and said photodetector is positioned in a second linear light path distinct from said first linear light path and divided by said beam splitter.

4. An optical pickup device as claimed in claim 3, further comprising:
   a wavelength plate provided between said objective lens and beam splitter; and
   a collimating lens provided between said light source and diaphragm.

5. An optical pickup device as claimed in claim 1, wherein the numerical aperture of said diaphragm is set to 0.6.

6. An optical pickup device as claimed in claim 2, wherein the numerical aperture of said diaphragm is set to 0.6.

7. An optical pickup device as claimed in claim 3, wherein the numerical aperture of said diaphragm is set to 0.6.

8. An optical pickup device as claimed in claim 4, wherein the numerical aperture of said diaphragm is set to 0.6.

9. An optical pickup device as claimed in claim 5, wherein the numerical aperture of said objective lens is set to 0.63.

10. An optical pickup device as claimed in claim 6, wherein the numerical aperture of said objective lens is set to 0.63.

11. An optical pickup device as claimed in claim 7, wherein the numerical aperture of said objective lens is set to 0.63.

12. An optical pickup device as claimed in claim 8, wherein the numerical aperture of said objective lens is set to 0.63.

13. An optical pickup device comprising:
   an objective lens unit having an objective lens facing a disc and a light controller for controlling the light of an intermediate region between a near axis region and a far axis region of the light incident onto the disc;

a light source for radiating light to the disc via said objective lens;

a beam splitter, provided between said light source and objective lens, for directing the light reflected from said disc in a path different from that of the light radiated from said light source;

a photodetector for detecting the light reflected from the disc and transmitted via said beam splitter; and a diaphragm provided between said beam splitter and light source and having a predetermined numerical aperture smaller than the numerical aperture of said objective lens.

14. An optical pickup device as claimed in claim 13, wherein said photodetector and objective lens are positioned in a first linear light path and said light source is positioned in a second linear light path distinct from said first linear light path and divided by said beam splitter.

15. An optical pickup device as claimed in claim 13, wherein said light source and objective lens are positioned in a first linear light path and said light source is positioned in a second linear light path distinct from said first linear light path and divided by said beam splitter.

16. An optical pickup device as claimed in claim 15, further comprising:

a wavelength plate provided between said objective lens and beam splitter; and a collimating lens provided between said light source and diaphragm.

17. An optical pickup device as claimed in claim 13, wherein the numerical aperture of said diaphragm is set to 0.6.

18. An optical pickup device as claimed in claim 14, wherein the numerical aperture of said diaphragm is set to 0.6.

19. An optical pickup device as claimed in claim 15, wherein the numerical aperture of said diaphragm is set to 0.6.

20. An optical pickup device as claimed in claim 16, wherein the numerical aperture of said diaphragm is set to 0.6.

21. An optical pickup device as claimed in claim 13, wherein the numerical aperture of said objective lens is set to 0.63.

22. An optical pickup device as claimed in claim 14, wherein the numerical aperture of said objective lens is set to 0.63.

23. An optical pickup device as claimed in claim 15, wherein the numerical aperture of said objective lens is set to 0.63.

24. An optical pickup device as claimed in claim 16, wherein the numerical aperture of said objective lens is set to 0.63.

25. An optical pickup device as claimed in claims 17, wherein the numerical aperture of said objective lens is set to 0.63.

26. An optical pickup device as claimed in claims 18, wherein the numerical aperture of said objective lens is set to 0.63.

27. An optical pickup device as claimed in claims 19, wherein the numerical aperture of said objective lens is set to 0.63.

28. An optical pickup device as claimed in claims 20, wherein the numerical aperture of said objective lens is set to 0.63.

29. An optical pickup device for radiating incident light onto a disc, comprising:

a light source for emitting the incident light:

an objective lens unit having an objective lens with an optical axis, facing the disc, to focus the radiated incident light from said light source onto the disc;

a light controller to block the incident light passing through an intermediate region between a near axis region and a far axis region of the objective lens, wherein the near, intermediate and far axis regions are distances relative to the optical axis;

a detecting device to detect light that is reflected from the disc;

a beam splitter, in an optical path between said light source and said objective lens, to direct the reflected light to said detecting device and in a different optical path from that of said light source; and a diaphragm, between said beam splitter and said light source, and having a predetermined numerical aperture smaller than a numerical aperture of said objective lens.

30. An optical pickup device as claimed in claim 29, wherein said light controller is a light controlling film formed on the objective lens, to block the incident light from passing through the intermediate region of the objective lens.

31. An optical pickup device as claimed in claim 30, wherein the light controlling film has an annular shape.

32. An optical pickup device as claimed in claim 30, wherein the light controlling film has a perimetrical shape.

33. An optical pickup device as claimed in claim 29, wherein said light controller is a light controlling groove of a predetermined pattern formed in the objective lens, to block the incident light from passing through the intermediate region of the objective lens.

34. An optical pickup device as claimed in claim 33, wherein the light controlling film has an annular shape.

35. An optical pickup device as claimed in claim 33, wherein the light controlling film has a perimetrical shape.

36. An optical pickup device as claimed in claim 29, wherein said light controller is a light controlling member provided between said objective lens unit and said beam splitter, said light controlling member having a light controlling film formed thereon to block the incident light from passing through the intermediate region of the objective lens.

37. An optical pickup device comprising:

an objective lens unit having an objective lens facing a disc and a light controller for controlling the light of an intermediate region between a near axis region and a far axis region of the light incident onto the disc;

a light source for radiating light to the disc via said objective lens;

a beam splitter, provided between said light source and objective lens, for directing the light reflected from said disc in a path different from that of the light radiated from said light source;

a photodetector for detecting the light reflected from the disc and transmitted via said beam splitter; and a diaphragm provided between said beam splitter and light source and having a fixed numerical aperture smaller than the numerical aperture of said objective lens.

* * * * *

UNITED STATES PATENT AND TRADEMARK OFFICE
CERTIFICATE OF CORRECTION

PATENT NO.: 5,986,993
DATED : November 16, 1999
INVENTOR(S): Jang-hoon YOO et al.

It is certified that [an/error[s]] appears in the above-identified patent and that said Letters Patent is hereby corrected as shown below:

on the Title Page:

[54]  "DIAPHRAM" should be --DIAPHRAGM--.

[73]  "Seoul" should be --Suwon--.

Signed and Sealed this

Twelfth Day of September, 2000

*Attest:*

Q. TODD DICKINSON

*Attesting Officer*  *Director of Patents and Trademarks*